(No Model.)
W. FRISHMUTH.
GALVANIC CELL.
No. 358,030. Patented Feb. 22, 1887.
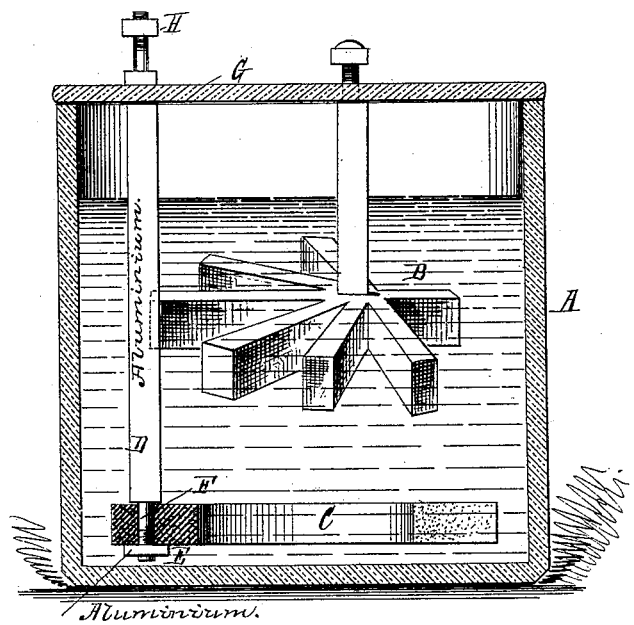
WITNESSES:
Gustave Dieterich
Edgar Goodwin
INVENTOR
William Frishmuth
BY Park Benjamin
his.
ATTORNEY

UNITED STATES PATENT OFFICE.

WILLIAM FRISHMUTH, OF PHILADELPHIA, PENNSYLVANIA, ASSIGNOR, BY DIRECT AND MESNE ASSIGNMENTS, TO RUDOLPHE DE MONTGELAS, WILLIAM H. GAW, J. HINCKLEY CLARK, RUDOLPH ELLIS, HENRY JUNGERICH, AND GEORGE C. POTTS, ALL OF SAME PLACE.

GALVANIC CELL.

SPECIFICATION forming part of Letters Patent No. 358,030, dated February 22, 1887.

Application filed October 20, 1886. Serial No. 216,715. (No model.)

*To all whom it may concern:*

Be it known that I, WILLIAM FRISHMUTH, of the city and county of Philadelphia, Pennsylvania, have invented a new and useful Improvement in Galvanic Cells, of which the following is a specification.

My invention relates to the connections in a galvanic cell, whereby the current is conducted from the carbon or non-attacked element; and it consists in constructing said connections of aluminium.

The accompanying drawing shows in elevation and partial section a well-known form of cell illustrative of my invention, in which zinc and carbon elements are employed.

One of the principal disadvantages incident to the use of carbon as an element in galvanic cells lies in the difficulty of securing the conducting-wire to it. If an ordinary clamp of iron or copper be used, local action between the metal and the carbon ensues, the metal is consumed, and a reverse current is caused in the cell. If holes be made in the carbor and the conducting-wire be soldered therein, the solder in time becomes eaten away. A joint outside the carbon cannot be protected by varnishing or covering the carbon with paraffine, because the battery-fluid gradually soaks up into the carbon and so attacks the holding device from the inside, and necessarily the clamp or holder is corroded on the face, where it must make direct contact with the carbon. There is no connecting contrivance of which I am aware which is, up to the present time, free from the difficulties above mentioned, and these difficulties result not merely in the ultimate breaking of the support or connection, but the gradual interposition of high resistance in the cell, due, as is well known to imperfect joints.

I have discovered that all of the above troubles may be obviated by the simple expedient of making the circuit-connections of the carbon or non-attacked electrode of aluminium. Aluminium is substantially inoxidizable, and hence is not liable to corrosion in ordinary cells. It is very near to carbon on the electro-motive scale; hence the local action between it and carbon is substantially nothing. It may be made easily by casting, or otherwise, into any desired form, and may take the shape of the simplest clamps or nuts, which, if of other metal—such as copper or iron—would speedily become useless through deformation by corrosion, &c. It is remarkably light and strong, and, finally, it is one of the best of electrical conductors.

In the drawing illustrative of my invention, A is the containing-vessel, B the zinc element, and C a carbon element. Any suitable electrolytic liquid is contained in the vessel A.

D is a rod of aluminium, which is connected to the carbon element by a nut, E, of aluminium, received upon a threaded part, F, of the rod, which passes through the carbon. The upper end of the rod, which passes through the cover G of the cell, is provided with a threaded portion and nut H to receive the conducting-wire.

I show in illustration of my invention this very simple mode of connecting the rod D and element C together—namely, a threaded extremity and nut—because it is one which would shortly prove useless if ordinary metals—such as iron and copper—were employed.

I claim—

1. In a galvanic cell, an element of carbon and a circuit-connection of aluminium, substantially as described.

2. In a galvanic cell, a carbon element, C, and aluminium rod D, having a threaded lower portion, F, and nut E, substantially as described.

WILLIAM FRISHMUTH.

Witnesses:
R. MONTGELAS,
W. H. GAW.